US009348052B2

(12) United States Patent
Collins et al.

(10) Patent No.: US 9,348,052 B2
(45) Date of Patent: May 24, 2016

(54) ANALYTIC ESTIMATION APPARATUS, METHODS, AND SYSTEMS

(75) Inventors: Mark V. Collins, Houston, TX (US); Arthur Cheng, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 29 days.

(21) Appl. No.: 14/343,006

(22) PCT Filed: Aug. 28, 2012

(86) PCT No.: PCT/US2012/052658
§ 371 (c)(1),
(2), (4) Date: Mar. 5, 2014

(87) PCT Pub. No.: WO2013/039687
PCT Pub. Date: Mar. 21, 2013

(65) Prior Publication Data
US 2014/0222346 A1  Aug. 7, 2014

Related U.S. Application Data

(60) Provisional application No. 61/533,620, filed on Sep. 12, 2011, provisional application No. 61/533,420, filed on Sep. 12, 2011.

(51) Int. Cl.
*G01V 1/50* (2006.01)
*G01V 1/36* (2006.01)

(52) U.S. Cl.
CPC .. *G01V 1/50* (2013.01); *G01V 1/36* (2013.01); *G01V 2210/1299* (2013.01); *G01V 2210/27* (2013.01); *G01V 2210/67* (2013.01)

(58) Field of Classification Search
CPC ....... G01V 1/36; G01V 1/50; G01V 2210/67; G01V 2210/27; G01V 2210/1299; G01V 2001/526

USPC ............................................. 367/56; 702/14
See application file for complete search history.

(56) References Cited

U.S. PATENT DOCUMENTS

| 4,912,979 A | 4/1990 | Sondergeld et al. |
| 5,278,805 A * | 1/1994 | Kimball .................. G01V 1/48 367/31 |

(Continued)

FOREIGN PATENT DOCUMENTS

| WO | WO-2013039687 A1 | 3/2013 |
| WO | WO-2013039690 A1 | 3/2013 |

OTHER PUBLICATIONS

"International Application Serial No. PCT/US2012/052658, Search Report mailed Nov. 14, 2012", 2 pgs.

(Continued)

*Primary Examiner* — Ari M Diacou
(74) *Attorney, Agent, or Firm* — Schwegman, Lundberg & Woessner, P.A.; Benjamin Fite

(57) ABSTRACT

In some embodiments, apparatus and systems, as well as methods, may operate to record a plurality of acoustic waveforms corresponding to acoustic waves received at azimuthally orthogonal dipole receiver arrays surrounded by a geological formation, the waves being generated by azimuthally orthogonal transmitter arrays. Further activity may include analytically estimating a global minimum of a predefined objective function with respect to an azimuth angle at a point in an auxiliary parameter space associated with a set of auxiliary parameters, minimizing the objective function at the analytically estimated angle with respect to the auxiliary parameters, removing existing ambiguities associated with the fast and slow principal flexural wave axes, and determining at least one property of the geological formation based on the global minimum. Additional apparatus, systems, and methods are disclosed.

20 Claims, 11 Drawing Sheets

(56) References Cited

U.S. PATENT DOCUMENTS

| | | | |
|---|---|---|---|
| 5,541,890 | A | 7/1996 | Tang |
| 5,712,829 | A | 1/1998 | Tang et al. |
| 5,740,124 | A | 4/1998 | Chunduru et al. |
| 5,791,899 | A * | 8/1998 | Sachdeva ............ A61B 17/0401 433/173 |
| 5,808,963 | A | 9/1998 | Esmersoy |
| 6,098,021 | A * | 8/2000 | Tang ........................ G01V 1/50 702/14 |
| 6,449,560 | B1 * | 9/2002 | Kimball ................... G01V 1/48 702/17 |
| 6,718,266 | B1 | 4/2004 | Sinha et al. |
| 6,791,899 | B2 | 9/2004 | Blanch et al. |
| 6,826,485 | B1 | 11/2004 | Bale et al. |
| 6,842,400 | B2 | 1/2005 | Blanch et al. |
| 7,295,926 | B2 | 11/2007 | Jeffryes |
| 7,310,285 | B2 | 12/2007 | Donald et al. |
| 7,474,996 | B2 | 1/2009 | Horne et al. |
| 7,623,412 | B2 | 11/2009 | Pabon et al. |
| 8,102,732 | B2 | 1/2012 | Pabon et al. |
| 8,326,539 | B2 | 12/2012 | Morrison et al. |
| 9,069,097 | B2 | 6/2015 | Zhang et al. |
| 2002/0186895 | A1 * | 12/2002 | Gloersen ................ G06F 17/18 382/285 |
| 2004/0158997 | A1 | 8/2004 | Tang |
| 2007/0140055 | A1 | 6/2007 | Tello et al. |
| 2007/0156359 | A1 * | 7/2007 | Varsamis ................ G01V 1/44 702/69 |
| 2007/0274155 | A1 * | 11/2007 | Ikelle ...................... G01V 1/36 367/38 |
| 2008/0319675 | A1 | 12/2008 | Sayers |
| 2009/0185446 | A1 | 7/2009 | Zeng et al. |
| 2010/0020642 | A1 | 1/2010 | Sinha |
| 2010/0034052 | A1 | 2/2010 | Pabon et al. |
| 2010/0309748 | A1 | 12/2010 | Tang et al. |
| 2011/0019501 | A1 | 1/2011 | Market |
| 2014/0195160 | A1 | 7/2014 | Collins et al. |
| 2015/0112596 | A1 * | 4/2015 | Collins ................... G01V 1/284 702/6 |

OTHER PUBLICATIONS

"International Application Serial No. PCT/US2012/052658, Written Opinion mailed Nov. 14, 2012", 6 pgs.

"International Application Serial No. PCT/US2012/052679, Search Report mailed Nov. 6, 2012", 2 pgs.

"International Application Serial No. PCT/US2012/052679, Written Opinion mailed Nov. 6, 2012", 3 pgs.

"Australian Application Serial No. 2012399003, Examination Report No. 1 mailed Oct. 20, 2014", 3 Pgs.

"Australian Application Serial No. 2012309006, Notice of Acceptance mailed Feb. 24, 2014", 8 pgs.

"Canadian Application Serial No. 2,848,465, Office Action mailed May 15, 2014", 2 pgs.

"Canadian Application Serial No. 2,848,465, Response filed Nov. 11, 2014 to Office Action mailed May 15, 2014", 2 pgs.

"European Application Serial No. 12831892.0, Office Action mailed Feb. 28, 2014", 3 pgs.

"European Application Serial No. 12831892.0, Response filed Aug. 27, 2014 to Office Action mailed Feb. 28, 2014", 13 pgs.

"European Application Serial No. 12832411.8, Office Action mailed Apr. 22, 2014", 3 pgs.

"European Application Serial No. 12832411.8, Response filed Oct. 14, 2014 to Official Action nailed Apr. 22, 2014", 12 pgs.

"International Application Serial No. PCT/US2012/052658, Written Opinion mailed Nov. 3, 2014", 4 pgs.

"International Application Serial No. PCT/U82012/052679, International Preliminary Report on Patentability mailed Mar. 20, 2014", 5 pgs.

Tang. X.-M., et al., "In: vol. 24—Quantitative Borehore Acoustic Methods", *Handbook of Geophysical Exploration: Seismic Exploration*. Elsevier Ltd., (2004), 159-167.

"Australian Application Ser. No. 2012309003, Response filed Feb. 15, 2015 to Examination Report No. 1 mailed Oct. 20, 2014", 19 pgs.

"Canadian Application Ser. No. 2,846,626, Office Action mailed May 1, 2015", 3 pgs.

"European Application Ser. No. 12832411.8, Office Action mailed Mar. 3, 2015", 1 pg.

"European Application Ser. No. 12832411.8, Response filed Mar. 23, 2015 to Extended European Search Report mailed Feb. 12, 2015 and Office Action mailed Mar. 3, 2015", 14 pgs.

"European Application Ser. No. 12832411.8, Supplementary European Search Report mailed Feb. 12, 2015", 7 pgs.

"International Application Ser. No. PCT/US2012/052658, International Preliminary Report on Patentability mailed Apr. 15, 2015", 4 pgs.

"International Application Ser. No. PCT/US2012/052658, Response filed Dec. 11, 2012 to Written Opinion mailed Nov. 14, 2012", 4 pgs.

"Mexican Application Serial No. MX/a/2014/002945, Office Action mailed Jan. 15, 2015", (w/ English Summary), 3 pgs.

"Mexican Application Ser. No. MX/a/2014/002945, Response filed Mar. 13, 2015 to Office Action mailed Jan. 15, 2015", (w/ English Translation of Claims), 15 pgs.

"U.S. Appl. No. 13/878,727, Non Final Office Action mailed Oct. 2, 2015", 10 pgs.

* cited by examiner

ANALYTIC ESTIMATION APPARATUS, METHODS, AND SYSTEMS

PRIORITY APPLICATION

This application is a U.S. National Stage Filing under 35 U.S.C. 371 from International Application Number PCT/US2012/052658, filed on 28 Aug. 2012, and published as WO 2013/039687 A1 on 21 Mar. 2013, which claims priority to U.S. Provisional Application Ser. No. 61/533,620, filed 12 Sep. 2011; and U.S. Provisional Application Ser. No. 61/533, 420, filed 12 Sep. 2011; which applications and publication are incorporated herein by reference in their entirety.

BACKGROUND

Conventional algorithms use only numerical searching for anisotropy processing of cross-dipole acoustic waveforms, to minimize an objective function whose parameters are the azimuth angle of the X-dipole transmitter relative to the fast principal flexural wave axis, and a set of auxiliary parameters. The auxiliary parameters are used to characterize the received waveforms as functions of slowness and borehole radius, among others.

DETAILED DESCRIPTION

The various embodiments described herein operate to provide an improved mechanism for minimizing the objective function. When this occurs with respect to all the parameters, the desired anisotropy angle is obtained. When processing cross-dipole acoustic waveform data for anisotropy using the Alford rotation relationship between in-line and cross-line data, it is common in conventional processing to minimize the objective function with respect to angle and the auxiliary parameters using a numerical search method or brute force. However, it can be shown that this is not necessary with cross dipole waveforms. By interpreting the time (or frequency) and transmitter/receiver ring indices as a joint data space, it is possible to derive equations for the angle of the X-dipole relative to the fast principal flexural wave axis that can be solved analytically. The resultant equations depend on inner products over the points in the space.

The advantages of analytic computation relative to numerical computation include the following:

1) The angle found at any given point in the auxiliary parameter space is a mathematically exact global minimum (up to computer precision) of the objective function at that point in the auxiliary parameter space. This is not guaranteed with a numerical search algorithm.

2) Depending on the complexity of the objective function and type of numerical search method employed, solving for the angle analytically can substantially decrease computer execution time.

3) Studying the objective function at the minimizing angle with respect to the remaining auxiliary parameters can give insight as to the best way to minimize the objective function with respect to the remaining parameters.

Earlier attempts to solve the problem might suggest using numerical search methods such as fast simulated annealing, gradient search, or brute force to minimize the objective function. However, none of these conventional mechanisms suggest analytically minimizing the objective function with respect to the azimuth angle. Compared to conventional methods, the analytic approach is generally faster per auxiliary data point and ensures a global minimum of the objective function with respect to angle.

In the detailed description that follows, it is noted that some of the apparatus and systems discussed herein are well known to those of ordinary skill in the art, and thus, the details of their operation are not disclosed in detail, in the interest of economy and clarity. Those that wish to learn more about these apparatus and systems are encouraged to refer to U.S. Pat. Nos. 6,791,899; 5,712,829; 5,808,963; 6,718,266; and 7,623,412; each of which are incorporated by reference herein in their entirety. Any and all portions of the apparatus, systems, and methods described in each of these documents may be used to realize the various embodiments described herein.

Data Acquisition and Processing

Figure 1:
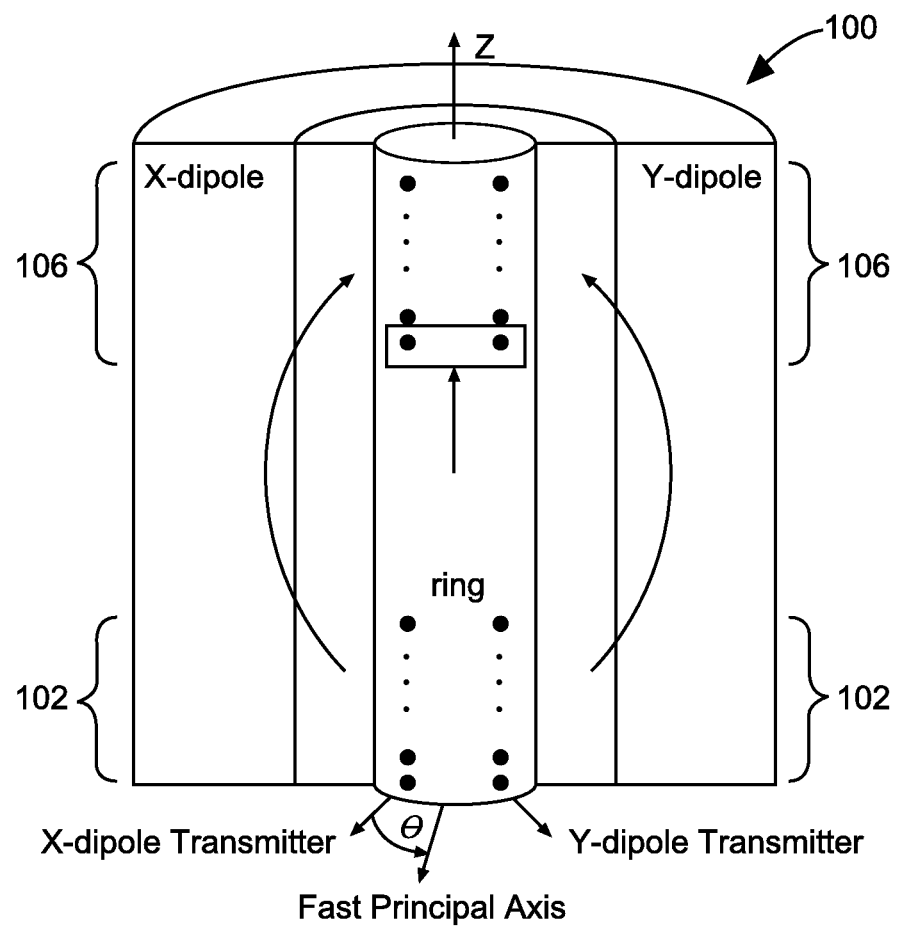
FIG. 1 is an acoustic tool operating according the various embodiments of the invention.

FIG. 1 shows a cross-dipole acoustic tool 100 in a borehole aligned along the z-axis that can be used in conjunction with the mechanism described herein. The tool 100 includes two azimuthally orthogonal dipole-transmitter arrays 102 and two azimuthally orthogonal dipole-receiver arrays 106. Each array has at least one element aligned along the tool axis. Specified in the traditional way, the recorded acoustic waveforms are denoted by in-line components, (XX, YY), and cross-line components, (XY, YX). The first letter refers to the transmitter, and the second letter to the receiver. Thus, for example, the XY recorded waveform is formed by firing the X-directed dipole transmitter and receiving at the Y-directed dipole receiver. The X and Y arrays are aligned along the z-axis such that the m'th element of array X is at the same z-position as the m'th element of array Y and is denoted as ring m. The fast principal wave axis of the formation is directed at angle $\theta$ relative to the x-axis. The Alford rotation equation assumes the waveforms transform as a second order tensor. Thus $$T^T X^j T = D_j, \quad (1)$$

where $$T = \begin{bmatrix} \cos\theta & -\sin\theta \\ \sin\theta & \cos\theta \end{bmatrix} \equiv \begin{bmatrix} c_\theta & -s_\theta \\ s_\theta & c_\theta \end{bmatrix},$$

-continued
$$X^j = \begin{bmatrix} XX_j & XY_j \\ YX_j & YY_j \end{bmatrix}, \text{ and } D_j = \begin{bmatrix} FP_j & 0 \\ 0 & SP_j \end{bmatrix}.$$

$XX_j, YY_j, XY_j$ and $YX_j$ are the in-line and cross-line waveforms from transmitter ring m to receiver ring n. j represents a data point j={m, n, t or ω}. $FP_j$ and $SP_j$ are the fast and slow principal waves. The fast principal axis is at angle θ relative to the x-axis. Written explicitly the elements of equation (1) are:

$(1,1) \Rightarrow c_\theta^2 XX_j + s_\theta^2 YY_j + s_\theta c_\theta (XY_j + YX_j) = FP_j,$ $(2,2) \Rightarrow c_\theta^2 YY_j + s_\theta^2 XX_j - s_\theta c_\theta (XY_j + YX_j) = SP_j,$ $(1,2) \Rightarrow c_\theta^2 XY_j - s_\theta^2 YX_j - s_\theta c_\theta (XX_j - YY_j) = 0,$ $(2,1) \Rightarrow c_\theta^2 YX_j - s_\theta^2 XY_j - s_\theta c_\theta (XX_j - YY_j) = 0.$ (2)

Processing Methods

Figure 2:
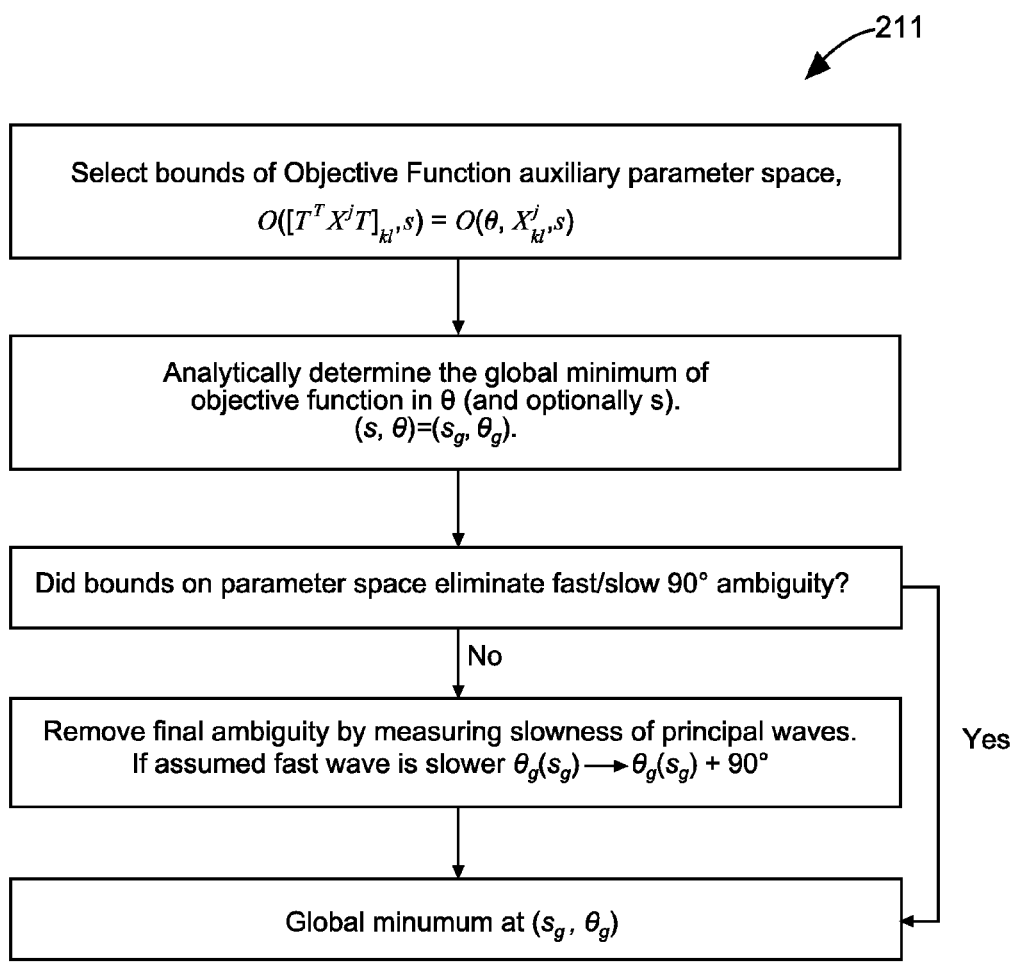
FIG. 2 is a flow chart illustrating anisotropy processing according to various embodiments of the invention.

FIG. 2 is a flow chart illustrating methods 211 of anisotropy processing according to various embodiments of the invention. Anisotropy algorithms solve for the angle θ by defining an objective function, $O([T^T X^j T]_{k1}, s)$, and minimizing the objective function with respect to (θ,s), where s is an auxiliary parameter space that defines the stacking of the points, j, used in the objective function and/or models the waveforms, $X^j$. Generally s includes at least a slowness parameter, but may include other parameters such as borehole radius and formation density. The minimization is done using analytical methods, as described in more detail below. Often there are two minima to be resolved, separated by 90°, corresponding to the fast and slow principal axes. FIG. 2 provides a general example of a processing algorithm 211 that can be used to find the global minimum.

It should be noted that many objective functions can be used and corresponding equations derived and coded that follow the methods described herein. Moreover, it should be noted that in the description that follows, "defining an objective function" may comprise using a machine, such as a signal processor or a surface computer, to detect an input (e.g., perhaps provided by a user input device) and use the input to select one of a set of objective functions, and then to execute instructions corresponding to processing the equations corresponding to the selected objective function. Objective functions can also be defined by the machine, by detecting the format of an equation, and/or a set of environmental parameters, along with a desired output quantity, and using the format, the set of parameters, and/or the desired output quantity to select the function definition.

(a) First Example Objective Function

As an example, consider an embodiment of the objective function specified in U.S. Pat. No. 6,791,899. In the case of a single transmitter ring, N receiver rings, and a single auxiliary parameter, slowness s, the objective function can be expressed in the form of equation (3):

$$O(\theta, s) \equiv \sum_{\substack{m \in \{1, \ldots, N\} \\ T_{ST} \le t \le T_{ST}+T}} [FP_{est}(\theta, t, s) - FP_m(\theta, t + sz_m)]^2,$$ (3)

where $$FP_{est}(\theta, t, s) \equiv \frac{1}{N} \sum_n FP_n(\theta, t + sz_n).$$ (4)

In equations (3) and (4), $T_{ST}$ is the start time of the flexural mode waveform at mid-array, and $z_m$ is the position of receiver ring m relative to mid-array. This objective function simply computes the variance of the (1,1) element of equation (2). For the correct choice of the angle θ, the waveform FP will travel at the slowness of the fast principal flexural wave, $s_1$, and the waveforms at each receiver, $FP_m$, will be stationary for $s=s_1$. At this point the objective function (variance) will be a minimum. The objective function will also be a minimum at θ+90° for $s=s_2$, the slowness of the slow principal wave. At intermediate values of the angle the waveform will be a mixture of the fast and slow principal waves, $FP_m$ will not be stationary for any value of s, and the objective function will not be a minimum. The 90° ambiguity between the fast principal flexural wave and the slow principal flexural wave is removed by computing the objective function over a plurality of strike angles and slowness values. Then the ambiguity can be removed by comparing the slowness values of the two minima.

(b) Second Example Objective Function

A more complex example is an embodiment of the objective function specified in U.S. Pat. No. 5,712,829. After studying some associated synthetic waveforms, it can be seen that the fast and slow principal waveforms are nearly identical, except for a time shift due to the difference in slowness. This makes it possible to form an objective function using all receiver combinations. In the case of a single transmitter ring, N receiver rings, and two auxiliary parameters, the objective function can be expressed in equation (5) as:

$$O(\theta, \delta s, s_2) \\ \sum_{\substack{m,n \in \{1, \ldots, N\} \\ T_{ST} \le t+s_1 z_m \le T_{ST}+T}} \left\{ \begin{array}{l} [SP_n(\theta, t - s_2(m-n)\delta z + \delta s(z_m + \bar{z})) - FP_m(\theta, t)]^2 + \\ [SP'_n(\theta, t - s_2(m-n)\delta z + \delta s(z_m + \bar{z})) - FP'_m(\theta, t)]^2 \end{array} \right\}.$$ (5)

In equation (5), δs is the difference in slowness of the principal waves, $\delta s = s_2 - s_1$, δz is the receiver element spacing, $\bar{z}$ is the distance from transmitter to receiver mid-array, and the primed functions are the derivatives with respect to θ of the fast and slow principal waves, such that:

$FP' \equiv \partial_\theta FP = c_{2\theta}(XY+YX) - s_{2\theta}(XX-YY) = SP'.$ (6)

Note also that FP' is the sum of the off-diagonal elements of equation (2).

The proposed approach is unique in that it takes advantage of treating the time and receiver ring indices as a joint data space, where time/frequency and ring index are only discriminated from one another through the particular stacking given by the value of the auxiliary parameters and bounds on the data points, $B(T_s,T)$. This simplifies the mathematics to the point where a systematic approach can be used to derive analytic minimization equations with respect to angle for a large class of objective functions.

The equations are a function of inner products over the sample space. The method described herein may provide insight as to the best numerical search method for minimizing the auxiliary parameters, and may even be used as the basis for algorithms that minimize the objective function with respect to all parameters analytically, so that numerical searching is completely eliminated in some embodiments.

Using analytic minimization with respect to the angle is novel, and not taught or suggested by the existing art. Nor is it an obvious extension of the existing art.

(c) Proposed Method

The proposed method is an algorithm for minimizing objective functions with respect to angle analytically in conjunction with minimizing the auxiliary parameters. The flowchart of the algorithm 311 is shown in FIG. 3, as a more detailed example of the activities in FIG. 2.

Figure 3:
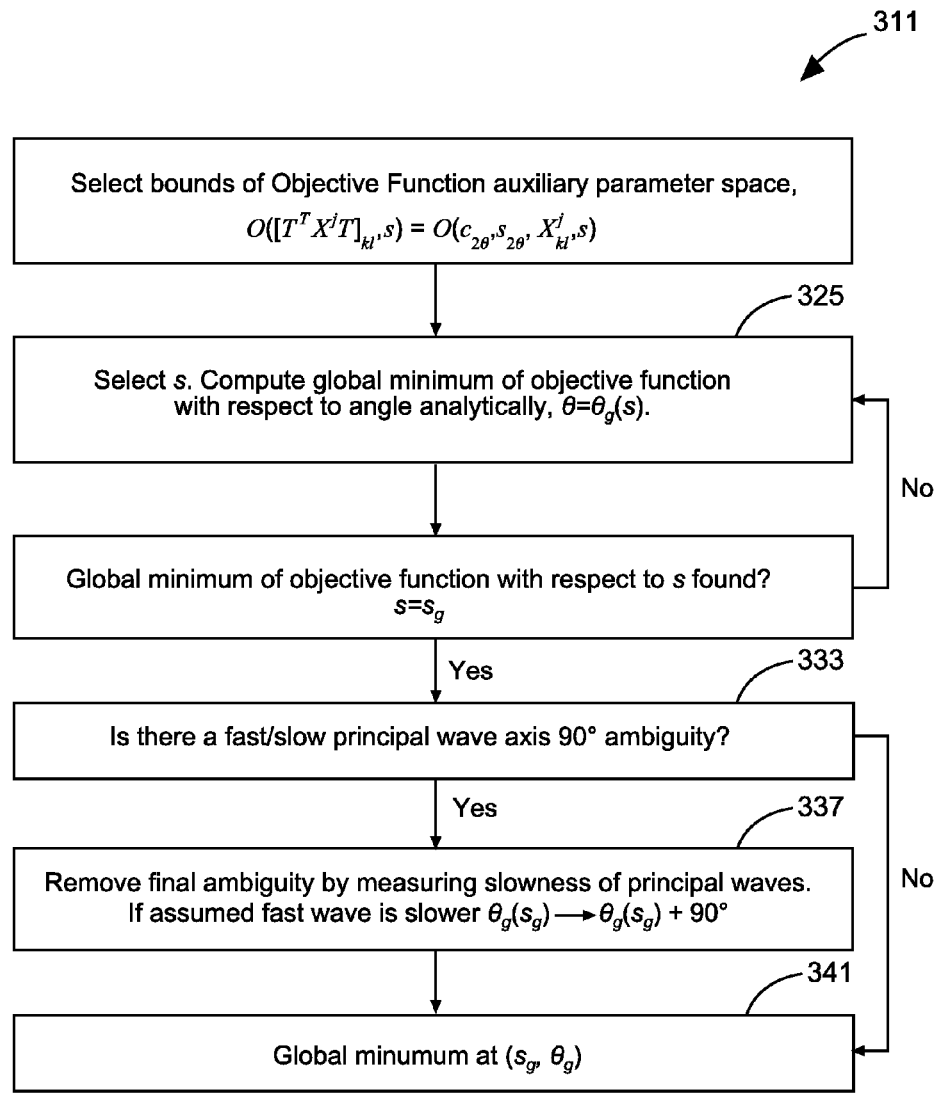
FIG. 3 is a more detailed flow chart illustrating analytic anisotropy processing according to various embodiments of the invention.

Although the algorithm 311 in FIG. 3 implies minimizing the auxiliary parameters using a numerical search method, this is not meant to limit the scope of the method with respect to the auxiliary parameters. For example, block 325 of FIG. 3, the algorithm for minimizing the objective function with respect to angle, is broken out in more detail in FIG. 4.

(d) Detailed Application to the First Example

First, the objective function given in equation (3) can be recast in the following form:

$$O(\theta, s) \equiv \sum_{j=(t+sz_m,m)}^{B(T_{ST},T)} [FP_{est}(j, \theta) - FP_j(\theta)]^2, \quad (8)$$

$$j \in B \forall \, m \text{ and } \{T_{ST} \leq t \leq T_{ST} + T\},$$

where $$FP_{est}(j = (t + sz_m, m), \theta) = \frac{1}{N}\sum_{n=1}^{N} FP_{j_n=(t+sn_n,n)}(\theta). \quad (9)$$

Note that the original notation of equations (1) and (2) is used here for convenience, where the subscript j refers to both time and receiver ring index. This emphasizes treating the time and receiver ring indices as a joint data space where time and ring index are only discriminated from one another through the particular stacking given by s and $B(T_s,T)$. Also note that $FP_{est}(j,\theta)$ is independent of the receiver ring index.

Figure 4:
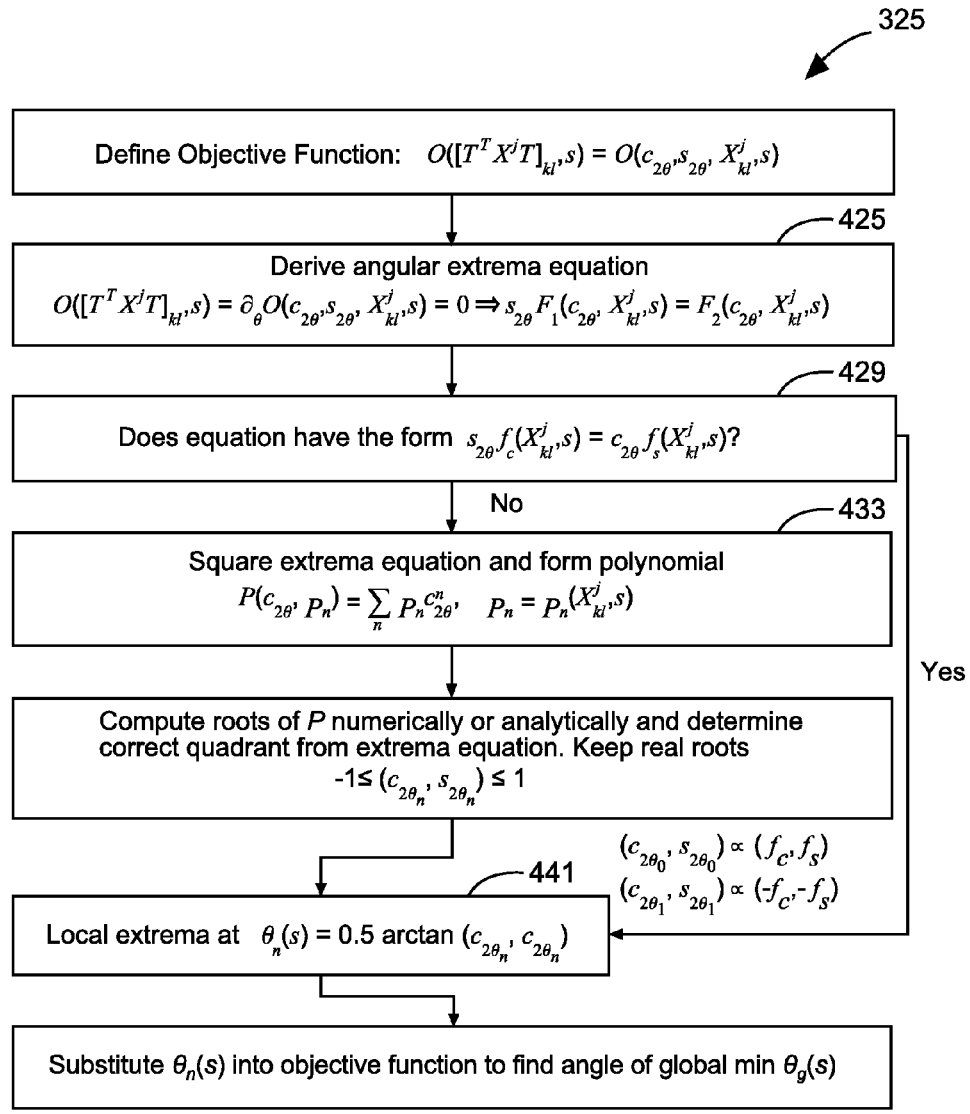
FIG. 4 is a more detailed flow chart illustrating analytic angle minimization according to various embodiments of the invention.

It is convenient (but not necessary) to express FP as a function of ($c_{2\theta}, s_{2\theta}$), since this reduces the order of the polynomial defined in block 433 of FIG. 4. This is always possible when the objective function uses elements of equation (2). Thus $$O(c_{2\theta}, s_{2\theta}, X_{kl}^j, s) = \frac{1}{4}\sum_j^B [a_j + c_{2\theta}b_j + s_{2\theta}c_j]^2 = \quad (9)$$

$$\frac{1}{4}[a^2 + c_{2\theta}^2 b^2 + 2c_{2\theta}\vec{a}\cdot\vec{b} + 2s_{2\theta}\vec{a}\cdot\vec{c} + 2s_{2\theta}c_{2\theta}\vec{b}\cdot\vec{c}],$$

where the vectors $(\vec{a}, \vec{b}, \vec{c})$ in the data space $j \in B$ are defined as $$a_j = (XX_{est}(j) + YY_{est}(j)) - (XX_j + YY_j),$$

$$b_j = (XX_{est}(j) - YY_{est}(j)) - (XX_j - YY_j),$$

$$c_j = (XY_{est}(j) + YX_{est}(j)) - (XY_j + YX_j). \quad (10)$$

Minimizing equation (9) with respect to $\theta$ yields the angular extrema equation defined in block 425 of FIG. 4, $$s_{2\theta}[c_{2\theta}(c^2 - b^2) - \vec{a}\cdot\vec{b}] = -2\vec{b}\cdot\vec{c}\,c_{2\theta}^2 - \vec{a}\cdot\vec{c}\,c_{2\theta} + \vec{b}\cdot\vec{c}. \quad (11)$$

Squaring equation (11) gives the polynomial in block 433 of FIG. 4:

$$P = \sum_{n=0}^{4} p_n c_{2\theta}^n, \quad (12)$$

where $$\begin{aligned}
p_0 &= (\vec{b}\cdot\vec{c})^2 - (\vec{a}\cdot\vec{b})^2, \\
p_1 &= 2(\vec{a}\cdot\vec{b})(c^2 - b^2) - 2(\vec{a}\cdot\vec{c})(\vec{b}\cdot\vec{c}), \\
p_2 &= (\vec{a}\cdot\vec{c})^2 - 4(\vec{b}\cdot\vec{c})^2 - (c^2 - b^2)^2 + (\vec{a}\cdot\vec{b})^2, \\
p_3 &= 4(\vec{b}\cdot\vec{c})(\vec{a}\cdot\vec{c}) - 2(\vec{a}\cdot\vec{b})(c^2 - b^2), \\
p_4 &= 4(\vec{b}\cdot\vec{c})^2 + (c^2 - b^2)^2.
\end{aligned} \quad (13)$$

In general, when using the elements of equation (2) in a least squares type objective function the resulting polynomial is no higher than fourth order. Once the polynomial is determined, the roots can be calculated either analytically or numerically, perhaps using the Matlab® software roots function.

Next, the extrema equation is used to determine the proper quadrant for the roots. Only real roots satisfying $-1 \leq (c_{2\theta}, s_{2\theta}) \leq 1$ are retained. The candidate roots are substituted back into the objective function to determine the global minimum of the objective function in angle at the point s in the auxiliary parameter space.

It is interesting to estimate the execution time of the analytic angle estimation algorithm. Note that the waveforms are interpolated, due to the time shifts. A conventional numerical method requires interpolating a single waveform, FP, at each test angle, whereas the analytic approach described herein interpolates three functions (XX+YY), (XX−YY), and (XY+YX) only once. Accounting for additional overhead used in the analytic approach due to solving the polynomial and insertion of candidate roots back into the objective function, one can derive equations for the execution time per auxiliary parameter point of the numerical and analytical methods, as shown in equation (14):

$$T_{NUM} = N_\theta K(T_I + 4T_M + 6T_A),$$

$$T_{ANA} = K(3T_I + 6T_M + 15T_A) + (10 + 16N_R)T_M + (9 + 8N_R)T_A + T_R, \quad (14)$$

where $N_\theta$ is the number of test angles required to isolate the global minimum per auxiliary parameter point, K is the number of data points, j, $T_I$ is the time to interpolate a data point, $T_M$ is the time to execute a multiply operation, $T_A$ is the time to execute an addition operation, $N_R$ is the number of roots, and $T_R$ is the time to solve for the roots. From equation (14), and noting that ordinarily K>>1, the analytic method (designated by $T_{ANA}$) described herein is roughly $N_\theta/3$ times faster than the conventional numeric method (designated by $T_{NUM}$). At this point we have completed the activity of block 325 in FIG. 3. Having found the minimum of the objective function in angle, the process can be repeated over the slowness and the minimum can be determined for the auxiliary parameter as well.

One way of proceeding is to repeat the angle minimization at each point on a uniform grid in slowness. Two minima in the objective function (as a function of slowness) would be found corresponding to the fast principal wave and slow principal wave, $s_1$ and $s_2$ respectively. The angles at these points, $\theta_1$ and $\theta_2$ respectively, are 90° apart and there is no fast/slow axis ambiguity. This corresponds to the "No" path from block 333 to block 341 in FIG. 3. Alternatively one could use a numerical search algorithm and isolate a single minimum in the objective function at an angle θ and a slowness s. One would not know whether this value is $s_1$ or $s_2$. Theoretically the minimum is zero at both points for non-dispersive waveforms. The ambiguity is removed by finding the slowness value that minimizes the objective function at θ+90° and comparing the slowness values. This corresponds to the "Yes" path from block 333 to block 337 in FIG. 3. The next example demonstrates the "Yes" path in FIG. 4 (from block 429 to block 441), where a shrewd choice of objective function simplifies the extrema equation.

(e) Application to the Second Example

In this example, the "Yes" path in FIG. 4 is described. To do so, the objective function described previously is altered. Specifically, the first term is scaled by a factor of 4 (or equivalently the second term by ¼), $$O(\theta, \delta s, s_2) \equiv \sum_{\substack{m,n \in \{1, \ldots, N\} \\ T_{ST} \leq t + s_1 z_m \leq T_{ST} + T}} \left\{ \begin{array}{l} 4[SP_n(\theta, t - s_2(m-n)\delta z + \delta s(z_m + \bar{z})) - FP_m(\theta, t)]^2 + \\ [SP'_n(\theta, t - s_2(m-n)\delta z + \delta s(z_m + \bar{z})) - FP'_m(\theta, t)]^2 \end{array} \right\}. \quad (15)$$

Once again it is mathematically expedient to change the notation as was done in the previous example, $$O(\theta, \delta s, s_2) \equiv \sum_{\substack{j_S = (t - s_2(m-n)\delta z + \delta s z_m) \\ j_F = (t + s_1 z_m)}}^{B(T_{ST}, T)} \{ 4[SP_{j_S}(\theta) - FP_{j_F}(\theta)]^2 + [SP'_{j_S}(\theta) - FP'_{j_F}(\theta, t)]^2 \}. \quad (16)$$

Note that the data point space is three dimensional due to the full inversion over all combinations of paired receiver rings. A final remapping of the data point space is now made, $$(j_F(m,n,t), j_S(m,n,t)) \rightarrow j(m,n,t). \quad (17)$$

This final remapping and the scaling factor of 4 greatly simplifies the objective function, $$O(c_{2\theta}, s_{2\theta}, \delta s, s_2) = [a^2 + b^2 + c^2 + 2c_{2\theta}\vec{a} \cdot \vec{b} - 2s_{2\theta}\vec{a} \cdot \vec{c}], \quad (18)$$

where $$a_j = (YY_{j_S} - XX_{j_F}) + (XX_{j_S} - YY_{j_F}),$$

$$b_j = (YY_{j_S} - XX_{j_F}) - (XX_{j_S} - YY_{j_F}),$$

$$c_j = XY_{j_S} + YX_{j_S} + XY_{j_F} + YX_{j_F}, \quad (19)$$

and results in the following extrema equation, $$s_{2\theta}\vec{a} \cdot \vec{b} = -c_{2\theta}\vec{a} \cdot \vec{c}. \quad (20)$$

Equation (20) demonstrates the "Yes" path in FIG. 4. There are two solutions separated by 90°. The correct one is determined by substituting the solutions into the objective function and selecting the one that gives a minimum. These angles have nothing to do with the fast/slow principal axis 90° ambiguity discussed in the previous example. That ambiguity potentially still exists and is removed by limiting the auxiliary parameter space to δs>0. Then the angle corresponds to the fast principal axis and demonstrates the "No" path from block 333 to block 341 in FIG. 3.

Figure 9:
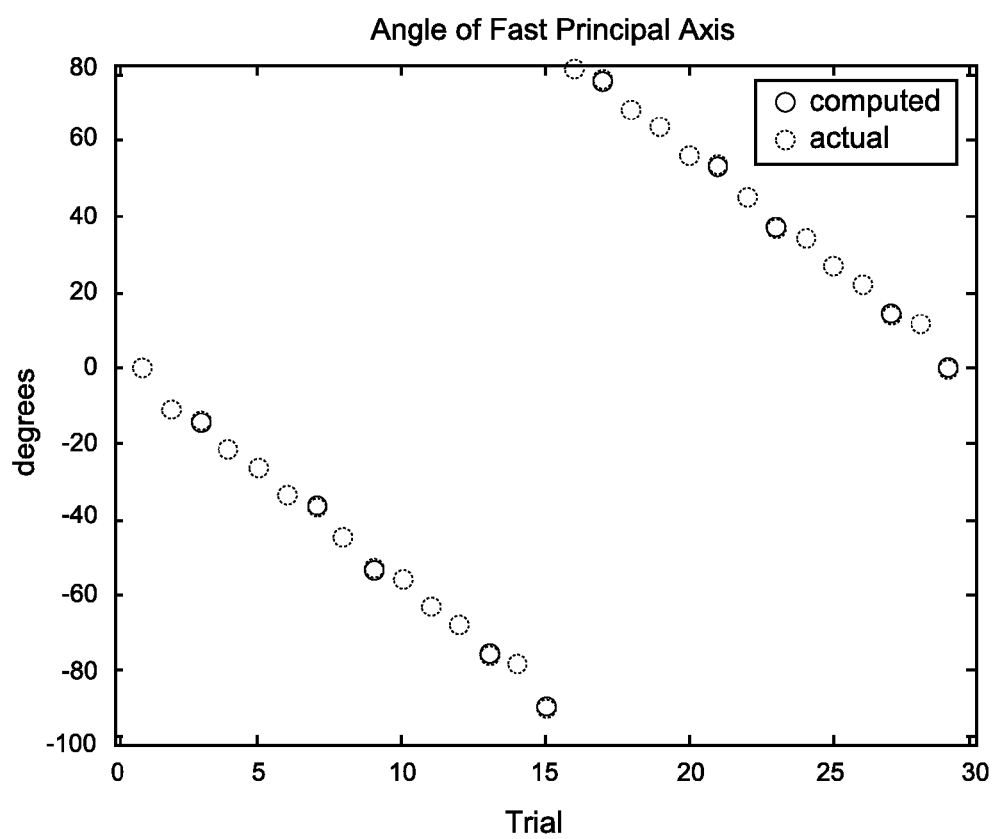
FIG. 9 is a graph illustrating computed versus actual results from processing synthetic waveforms according to various embodiments of the invention.

FIG. 9 compares angle estimates from processing synthetic FD waveforms at 29 different angles using the modified objective function of equation (18). The agreement between the angles of the synthetic dipoles used to generate the FD waveforms and the estimate from the algorithm is very good. The worst case error is 0.33°, with a mean value of 0.13°.

Given the global minimum of the objective function with respect to angle at a point in the auxiliary parameter space, the most useful method for minimizing the objective function with respect to the auxiliary parameters, δs and $s_2$ (or equivalently $s_1$), is determined by the behavior of the objective function, $O(\theta_g(s_1, \delta s), s_1, \delta s)$, in the $(s_1, \delta s)$ plane as mentioned previously.

Figure 10:
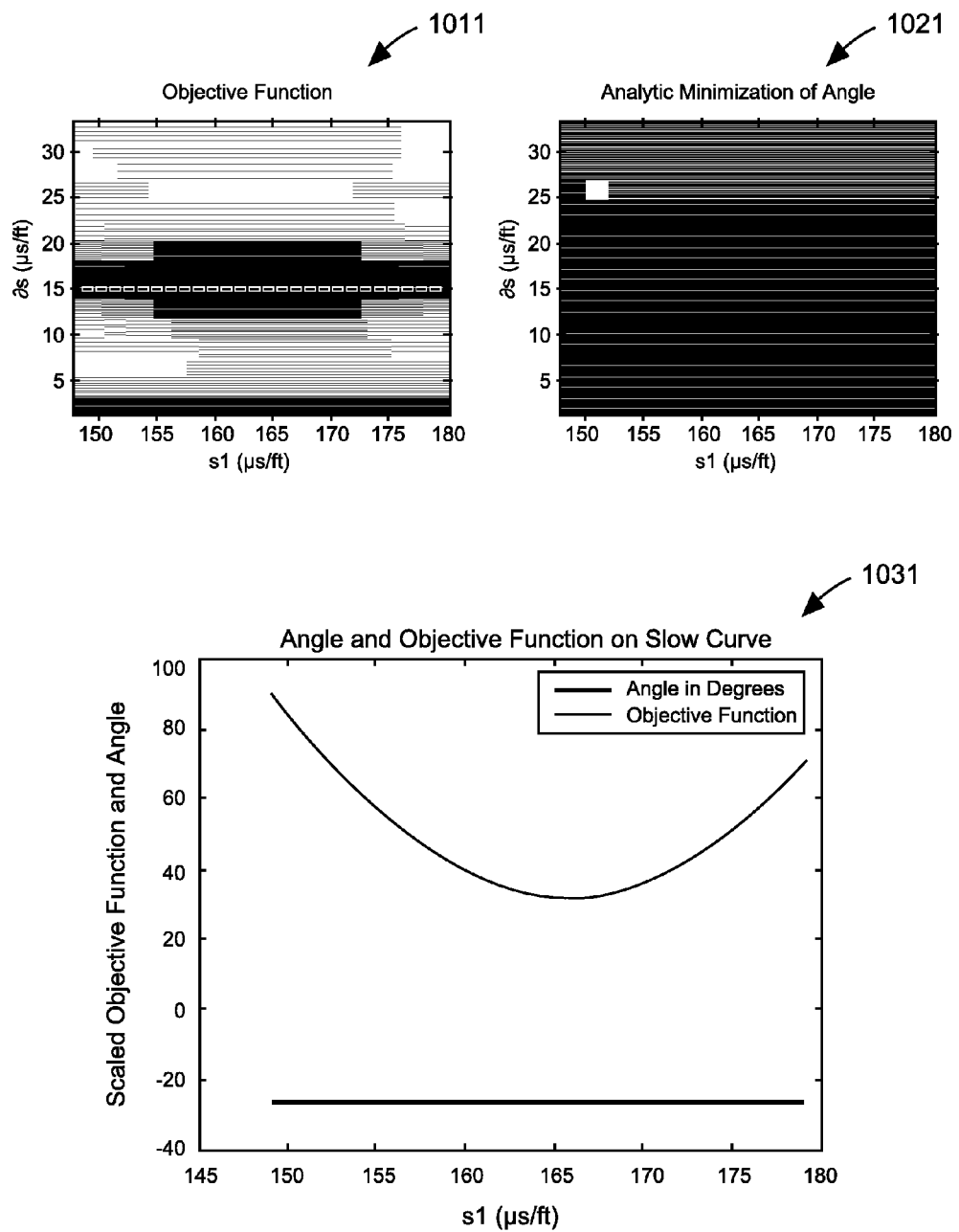
FIG. 10 includes three graphs illustrating synthetic waveform processing results at a specific angle according to various embodiments of the invention.

The graphs 1011 and 1021 in FIG. 10 show the objective function and the corresponding angles, $\theta_g(s_1, \delta s)$, as intensity maps in the auxiliary parameter space for a trial minimization where the fast axis is at an angle of −26.6° with respect to the dipole. Valleys are darker shades of gray, and peaks are lighter shades of gray. The dashed line in graph 1011 shows the value of δs that minimizes the objective function at each value of $s_1$. Studying these graphs 1011, 1021 reveals several interesting features:

The objective function is most sensitive to δs. This is understood from the objective function itself. δs is coupled to the spacing between transmitter and receiver, whereas $s_2$ (or equivalently $s_1$) is coupled to the inter-receiver spacing. Typically the latter spacing is much smaller than the former, resulting in greater sensitivity to δs.

The value of δs that minimizes the objective function at each value of $s_1$ is relatively stable. This can be seen from the dashed line in the graph 1011. Thus even for a relatively poor choice of $s_1$ the estimate of θ and δs will be accurate.

The angle estimate forms stable horizontal strips in the $(s_1, \delta s)$ plane. The difference in angle between the strips is typically 90° or 180°, with 180° having no physical significance. In this example, the change is 180°. Thus, even for a relatively poor choice of δs and $s_1$, the estimate of θ will be accurate.

The objective function shown in the graph 1031 is a smooth function with a well-defined minimum, making a numeric search for the value of $s_1$ that minimizes the objective function along this curve easy to implement.

Based on these observations, two alternative methods for minimizing the auxiliary parameters are given.

Method 1

Select a starting value for $s_1$ from a slowness measurement of one of the cross-dipole waveforms, XX or YY, or their average slowness, denoted $s_{xxoryy}$.

At this value of $S_1$, minimize the objective function $O(\theta_g(s_1, \delta s), s \&s)$ with respect to δs numerically. This gives a good initial estimate for θ and δs.

Use the hyperbolic tangent equation, $$s_1 = s_{xxoryy} - \delta s(1 + b \cdot \tanh[8(|\theta_g|/90° - 0.5)])/2, \quad (21)$$

where $$b = \begin{cases} +1 & \text{for } s_{xxoryy} = \text{slowness of } XX \\ -1 & \text{for } s_{xxoryy} = \text{slowness of } YY \\ 0 & \text{for } s_{xxoryy} = \text{average of } XX \text{ and } YY \text{ slowness,} \end{cases} \quad (22)$$

to estimate a new value of $s_1$.

Repeat the process until $s_1$ converges to some desired degree. This happens very rapidly (sometimes within a single iteration) since the initial estimates of θ and δs are quite good.

Method 2

Select a starting value for $s_1$ from a slowness measurement of one of the cross-dipole waveforms, XX or YY, or their average slowness.

Minimize the objective function $O(\theta_g(s_1, \delta s), s_1, \delta s)$ with respect to δs numerically, at the selected starting value of $s_1$.

Define a sparse grid in $s_1$ containing the initial value of $s_1$.

Starting at the values of $s_1$ on the grid that are neighbors to the initial value, do a numerical search to find the minimum with respect to δs using the initial δs value as an initial guess.

Repeat the process for the next neighbors on the grid using the last values of δs as the initial guess.

Use the values for the objective function, $s_1$, the angle, and δs on the grid to find the value of all parameters at the global minimum of the objective function by low order interpolation.

This analytic angle minimization method can be applied to other formulations of the objective function as well. Only a few will be mentioned here for the sake of brevity and clarity.

Objective functions that include ratios of squares can be analytically minimized with respect to angle, producing similar equations, and following the same procedure. Even more exotic objective functions can be used, but these increase the complexity of the polynomial, and correspondingly, the execution time. The algorithm can be applied to an objective function in the frequency domain with a summation over bandwidth instead of time. An inversion over all receiver pairs can be accomplished using phase shifts.

Figure 11:
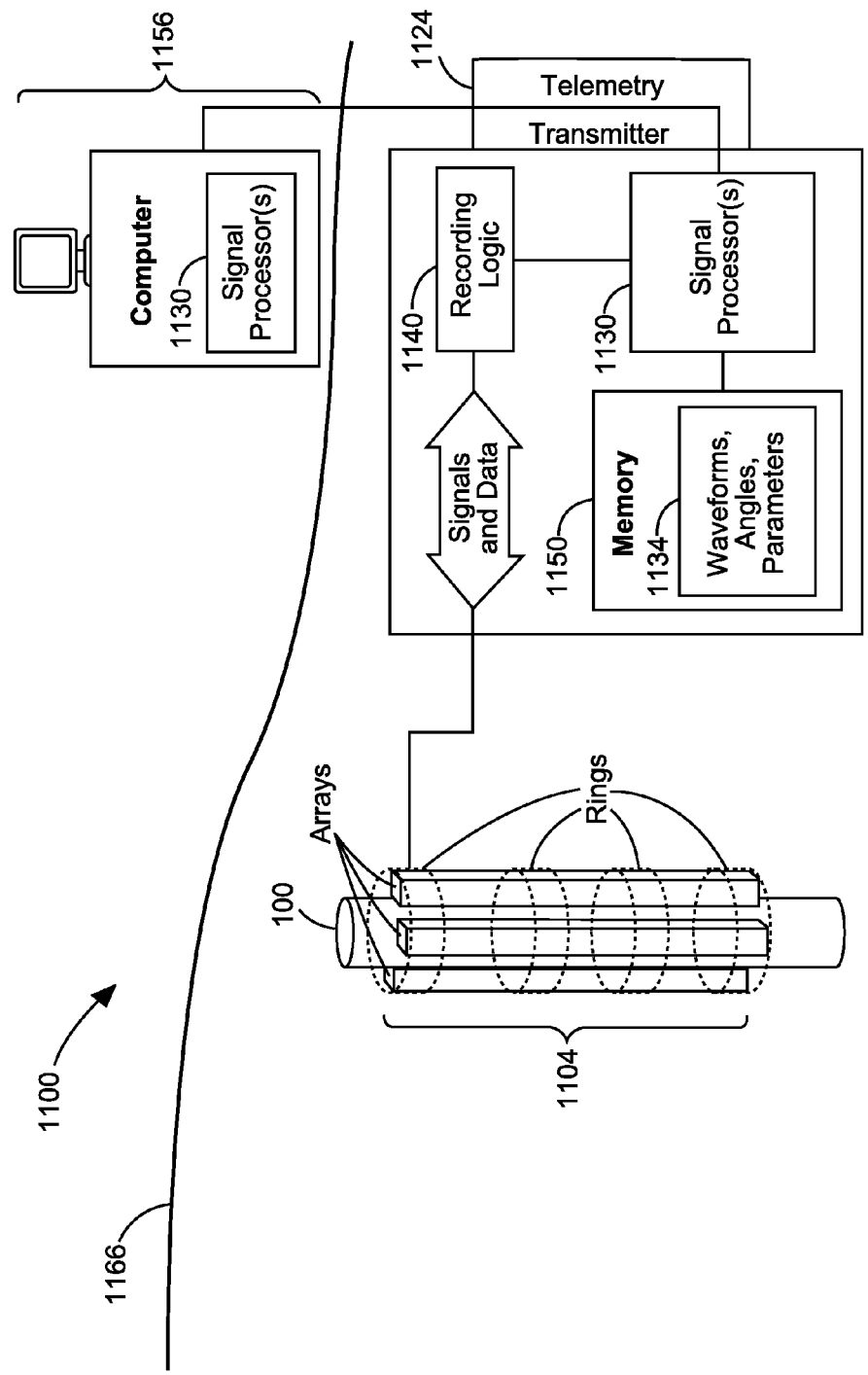
FIG. 11 is a block diagram of an apparatus according to various embodiments of the invention.

FIG. 11 is a block diagram of an apparatus 1100, according to various embodiments of the invention. The apparatus may comprise a number of components, including those described in the following paragraphs.

For example, an apparatus may comprise a set of receiver and transmitter arrays 1104, recording logic 1140, and one or more signal processors 1130. The arrays 1104 may be configured as azimuthally orthogonal dipole receiver arrays and azimuthally orthogonal transmitter arrays, attached to a down hole tool, similar to or identical to the tool 100 shown in FIG. 1. The logic 1140 may be configured to record a plurality of acoustic waveforms corresponding to acoustic waves received at the azimuthally orthogonal dipole receiver arrays, the waves being generated by the azimuthally orthogonal transmitter arrays.

The signal processor 1130 may be configured to estimate a global minimum of an objective function with respect to an azimuth angle and a set of auxiliary parameters associated with an auxiliary parameter space, said azimuth angle corresponding to an orientation of the transmitter arrays and the receiver arrays relative to fast and slow principal flexural wave axes. The signal processor 1130 may also be configured to estimate said azimuth angle by minimizing the objective function analytically with respect to the azimuth angle at a point in the auxiliary parameter space, said signal processor 1130 to minimize the objective function at said analytically estimated azimuth angle with respect to the set of auxiliary parameters over a domain of the auxiliary parameter space, and to remove existing ambiguities associated with the fast and slow principal flexural wave axes.

The apparatus may further comprise a memory 1150 to receive and store values 1134 corresponding to the azimuth angle and the auxiliary parameters at the global minimum. In some embodiments, the apparatus may comprise a telemetry transmitter 1124 to communicate values associated with the global minimum to a logging facility 1156 at the surface 1166.

Figure 5:
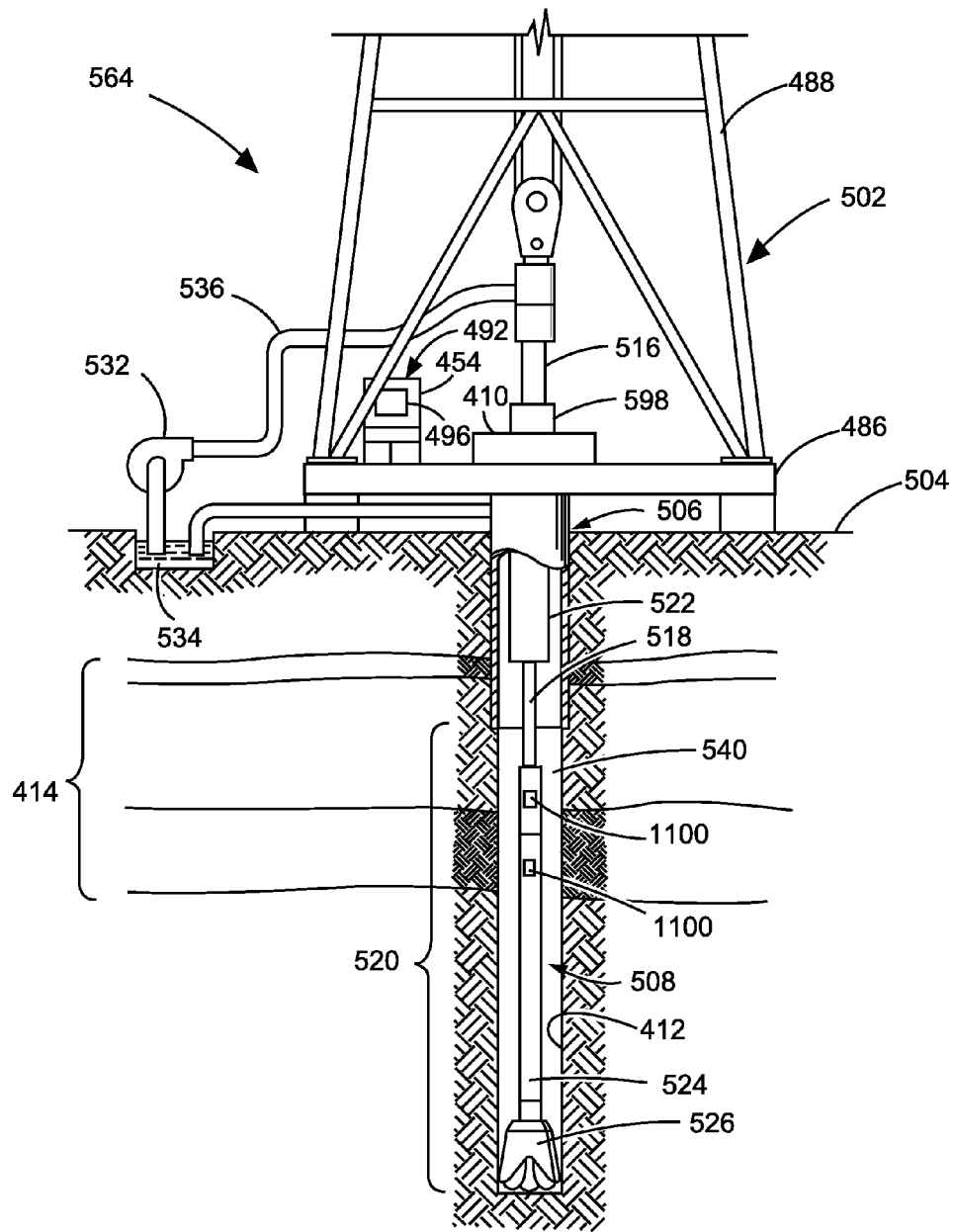
FIGS. 5-6 illustrate system embodiments of the invention.
Figure 6:
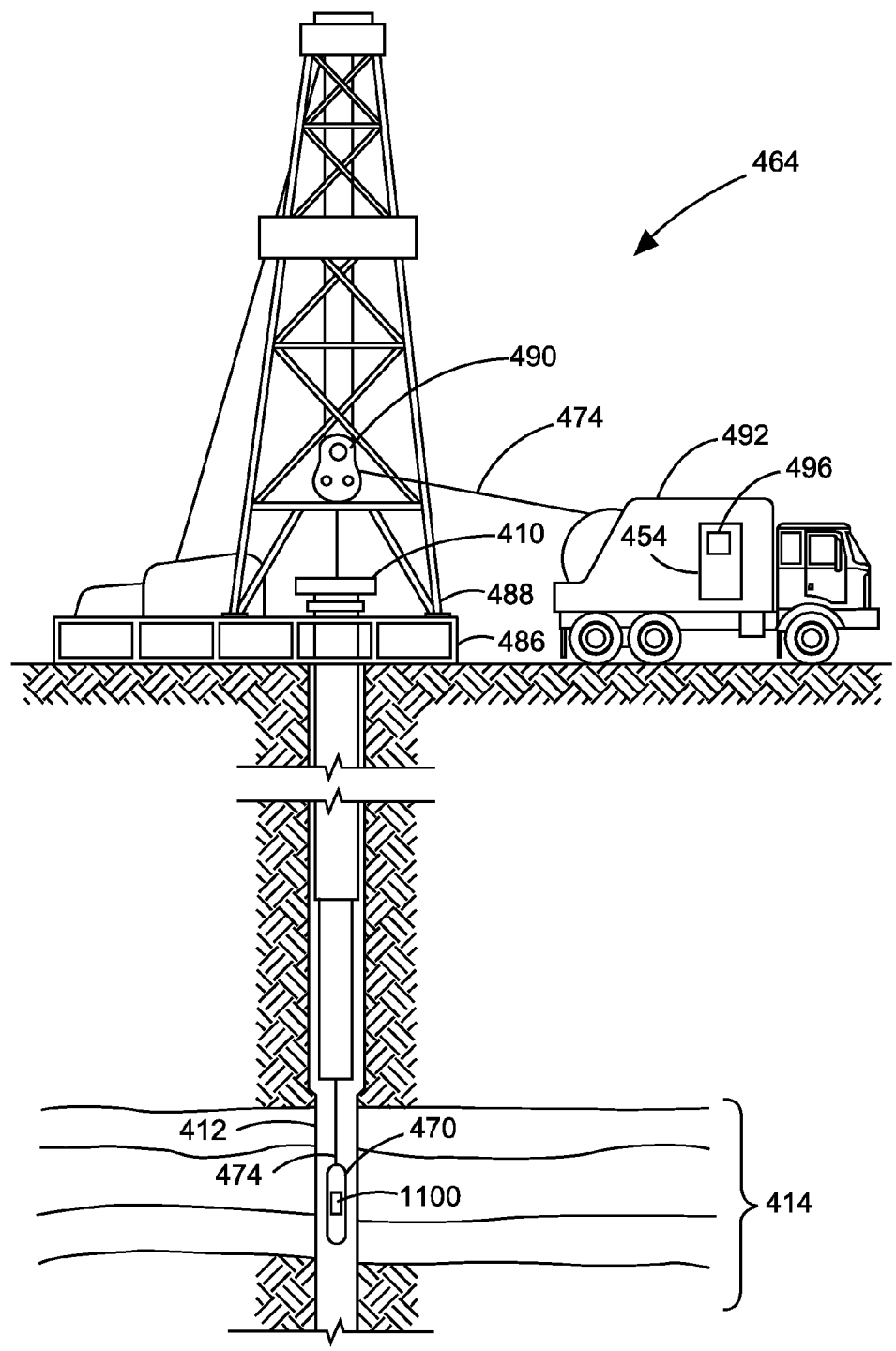

FIGS. 5-6 illustrate system embodiments of the invention. For example, FIG. 5 illustrates a drilling rig system 564 embodiment of the invention, and FIG. 6 illustrates a wireline system 464 embodiment of the invention. Thus, systems 464, 564 may comprise portions of a tool body 470 as part of a wireline logging operation, or of a downhole tool 524 as part of a downhole drilling operation.

Drilling of oil and gas wells is commonly carried out using a string of drill pipes connected together so as to form a drilling string that is lowered through a rotary table 410 into a wellbore or borehole 412. Turning now to FIG. 5, it can be seen how a system 564 may form a portion of a drilling rig 502 located at the surface 504 of a well 506. The drilling rig 502 may provide support for a drill string 508. The drill string 508 may operate to penetrate a rotary table 410 for drilling a borehole 412 through subsurface formations 414. The drill string 508 may include a Kelly 516, drill pipe 518, and a bottom hole assembly 520, perhaps located at the lower portion of the drill pipe 518. In some embodiments, apparatus 1100 may be carried as part of the drill string 508 or the downhole tool 524.

The bottom hole assembly 520 may include drill collars 522, a downhole tool 524, and a drill bit 526. The drill bit 526 may operate to create a borehole 412 by penetrating the surface 504 and subsurface formations 414. The downhole tool 524 may comprise any of a number of different types of tools including MWD (measurement while drilling) tools, LWD tools, and others.

During drilling operations, the drill string 508 (perhaps including the Kelly 516, the drill pipe 518, and the bottom hole assembly 520) may be rotated by the rotary table 410. In addition to, or alternatively, the bottom hole assembly 520 may also be rotated by a motor (e.g., a mud motor) that is located downhole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 414.

During drilling operations, a mud pump 532 may pump drilling fluid (sometimes known by those of skill in the art as "drilling mud") from a mud pit 534 through a hose 536 into the drill pipe 518 and down to the drill bit 526. The drilling fluid can flow out from the drill bit 526 and be returned to the surface 504 through an annular area 540 between the drill pipe 518 and the sides of the borehole 412. The drilling fluid may then be returned to the mud pit 534, where such fluid is filtered. In some embodiments, the drilling fluid can be used to cool the drill bit 526, as well as to provide lubrication for the drill bit 526 during drilling operations. Additionally, the drilling fluid may be used to remove subsurface formation 414 cuttings created by operating the drill bit 526.

FIG. 6 shows a well during wireline logging operations. A drilling platform 486 is equipped with a derrick 480 that supports a hoist 490. Here it is assumed that the drilling string has been temporarily removed from the borehole 412 to allow a wireline logging tool body 470, such as a probe or sonde that carries a sonic tool, to be lowered by wireline or logging cable 474 into the borehole 412. Typically, the tool body 470 is lowered to the bottom of the region of interest and subsequently pulled upward at a substantially constant speed.

During the upward trip, apparatus 1100 included in the tool body 470 may be used to perform measurements in the borehole 412 as they pass by. The measurement data can be communicated to a surface logging facility 492 for storage, processing, and analysis. The logging facility 492 may be provided with electronic equipment for various types of signal processing, which may be implemented by any one or more of the components of the apparatus 1100 shown in FIG. 11. The log data is similar to that which may be gathered and analyzed during drilling operations (e.g., during logging while drilling (LWD) operations).

The boreholes 110; 412; apparatus 1100; logging facility 492; display 396; rotary table 410; formation 414; systems 464, 564; tool body 470; drilling platform 486; derrick 480; hoist 490; logging cable 474; drilling rig 502; well 506; drill string 508; Kelly 516; drill pipe 518; bottom hole assembly 520; drill collars 522; downhole tool 524; drill bit 526; mud pump 532; mud pit 534; and hose 536 may all be characterized as "modules" herein. Such modules may include hardware circuitry, and/or a processor and/or memory circuits, software program modules and objects, and/or firmware, and combinations thereof, as desired by the architect of the apparatus 1100 and systems 464, 564, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for drilling operations, and thus, various embodiments are not to be so limited. The illustrations of apparatus 1100 and systems 464, 564 are intended to provide a general understanding of the structure of various embodiments, and they are not intended to serve as a complete description of all the elements and features of apparatus and systems that might make use of the structures described herein.

Applications that may incorporate the novel apparatus and systems of various embodiments include a variety of electronic systems, such as televisions, cellular telephones, personal computers, workstations, radios, video players, vehicles, and location technology (e.g., GPS (Global Positioning System) location technology), signal processing for geothermal tools and smart transducer interface node telemetry systems, among others.

Thus, a system 464, 564 may comprise a down hole tool and one or more apparatus, as described previously. The downhole tool may comprise a wireline tool or a measurement while drilling tool, among others. In some embodiments, the azimuthally orthogonal dipole receiver arrays and azimuthally orthogonal transmitter arrays, as part of the apparatus, are each attached to the down hole tool. The recording logic, as part of the apparatus, may be attached to the tool, or form part of a surface computer. Similarly, the signal processor, as part of the apparatus, may also be attached to the tool, or form part of a surface computer. Thus, the signal processor can be attached to the tool and the results of estimating the global minimum of the objective function can be sent to the surface, or the signal processor can operate entirely on the surface. Some embodiments include a number of methods.

Figure 7:
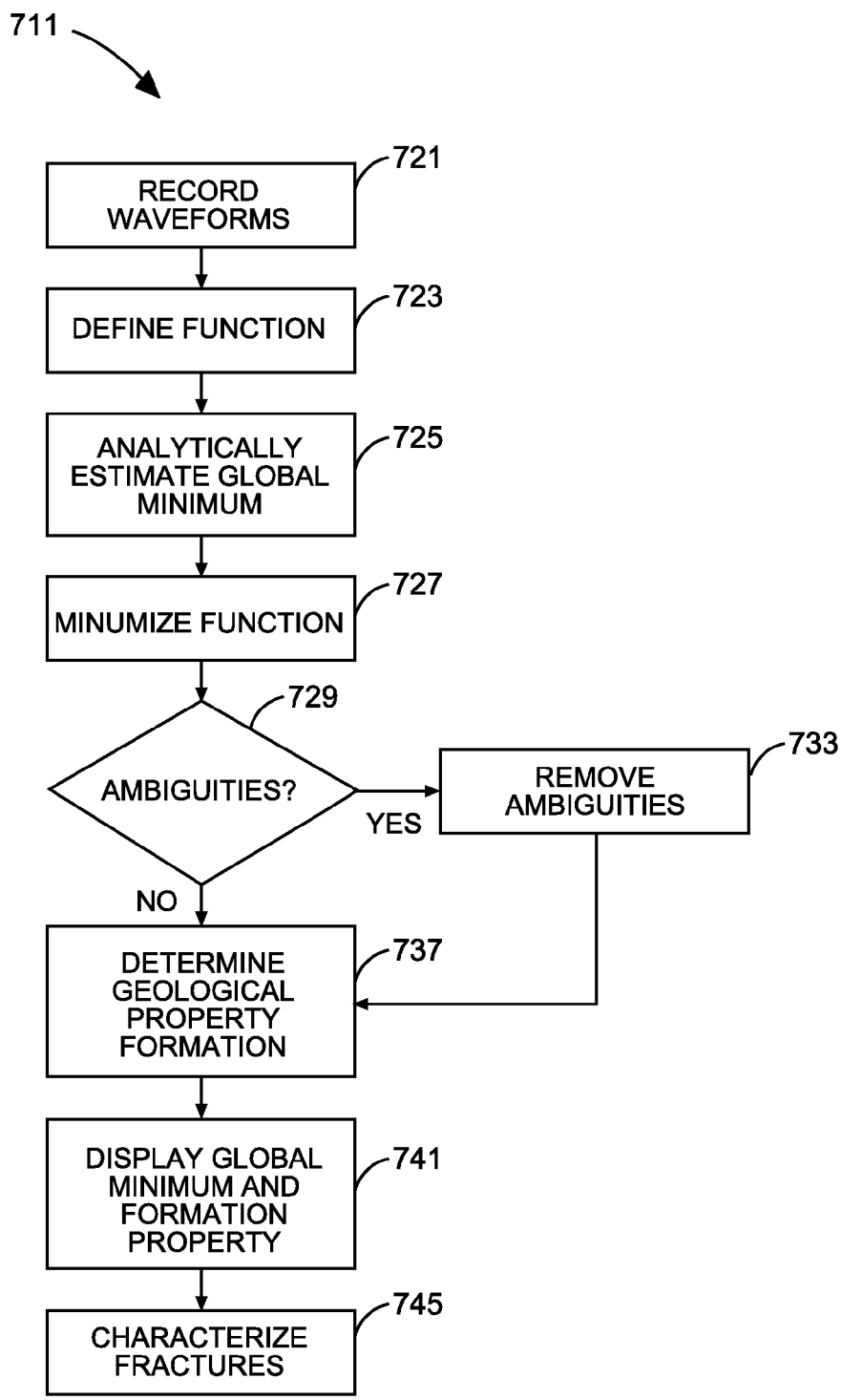
FIG. 7 is a flow chart illustrating several methods according to various embodiments of the invention.

FIG. 7 is a flow chart illustrating several methods according to various embodiments of the invention. For example, a processor-implemented method 711 to execute on one or more processors that perform methods to estimate a fast shear wave (fast principal flexural wave axis) azimuth, relative to the axis of transmission for an X-dipole transmitter, may comprise: at block 721, recording a plurality of acoustic waveforms corresponding to acoustic waves received at azimuthally orthogonal dipole receiver arrays surrounded by a geological formation, the waves being generated by azimuthally orthogonal transmitter arrays; at block 723, defining an objective function dependent on the acoustic waveforms comprising cross-dipole waveforms, and an azimuth angle corresponding to an orientation of the transmitter arrays and the receiver arrays relative to fast and slow principal flexural wave axes and a set of auxiliary parameters; at block 725, analytically estimating a global minimum of the objective function with respect to the azimuth angle at a point in an auxiliary parameter space associated with the set of auxiliary parameters; at block 727, minimizing the objective function at the analytically estimated angle with respect to the auxiliary parameters; at block 733 (if ambiguities are determined to exist at block 729), removing existing ambiguities associated with the fast and slow principal flexural wave axes; and at block 737, determining at least one property of the geological formation based on the global minimum.

Analytically estimating may further comprise: determining the global minimum by finding a minimum of the objective function with respect to the azimuth angle analytically at a point in the auxiliary parameter space.

The process of analytical estimation may comprise deriving an angular extrema equation of a form that separates complementary trigonometric functions, for example $s_{2\theta}=F(c_{2\theta},X,s)$, by differentiating the objective function with respect to the angle $\theta$ for the waveforms, X, fixed in the time or frequency domain, and the set of auxiliary parameters s. Other forms of the extrema equation that separate the trigonometric functions may be used, for example $C_{2\theta}=F(s_{2\theta},X,s)$.

Thus, analytically estimating may further comprise: deriving an angular extrema equation to separate complementary trigonometric functions by differentiating the objective function with respect to the azimuth angle for the waveforms in the time or frequency domain, and the set of auxiliary parameters.

The extrema equation may be of the form $s_{2\theta}=F(c_{2\theta},X,s)$ or $c_{2\theta}=F(s_{2\theta},X,s)$, where the objective function is differentiated with respect to the angle $\theta$, in the time or frequency domain.

Analytically estimating may further comprise determining locations in angle of extrema associated with the angular extrema equation, based on a form of the angular extrema equation.

Determining locations in angle of extrema based on a form of the angular extrema equation may comprise forming a polynomial in one of the trigonometric terms by raising the angular extrema equation to a power and substituting a complimentary trigonometric identity, for example squaring the extrema equation and substituting $(s_{2\theta})^2=1-(c_{2\theta})^2$. Thus, determining locations in angle of extrema may comprise: forming a polynomial equation by raising the angular extrema equation to a power and substituting a complimentary trigonometric identity.

The roots of the polynomial equation can be found, with only physically allowed roots (e.g., real with magnitude<=1) being retained, and the proper quadrant can be determined by referencing the extrema equation. Thus, the method 711 may further comprise: solving for real roots of the polynomial equation, in a quadrant determined by the extrema equation.

Solving for the roots and proper quadrant, denoted ($c_{2\theta n}$, $s_{2\theta n}$), of the polynomial may be accomplished by using a numerical algorithm (e.g., a Matlab® software root function) or by analytic solution. An example of an analytic solution for the physical roots and proper quadrant in the case of an extrema equation of the form $s_{2\theta}f_C(X,s)=c_{2\theta}f_S(X,s)$ being: $\theta_0(s)=0.5 \arctan(f_S(X,s), f_C(X,s))$, $\theta_1(s)=0.5 \arctan(-f_S(X,s),$ −$f_C(X,s)$). Thus, solving for real roots may comprise using one of a numerical algorithm or an analytic solution.

Determining the global minimum by finding a minimum of the objective function may comprise: substituting candidate values comprising candidate angles or trigonometric equivalents of the candidate angles given by retained roots of the polynomial back into the objective function and selecting one of the candidate values that minimizes the objective function.

Minimizing the objective function at the analytically estimated angle with respect to the set of auxiliary parameters may comprise: conducting a numerical search or executing an analytical approach.

The numerical search and analytical approach can be used to solve any ambiguities between the fast and slow principal flexural wave axes. Thus, the numerical search or the analytical approach may operate to resolve the existing ambiguities.

The method 711 may further comprise, at block 741, displaying the global minimum in conjunction with the at least one property of the geological formation.

When there is knowledge of the absolute orientation of a down hole tool, fractures in the formation can be detected and characterized, along with the ambient stress field in the formation. These characteristics can be useful in optimizing development of a reservoir. Thus, the method 711 may further comprise, at block 745, characterizing fractures in the formation associated with an ambient stress field in the formation.

Additional activities forming a part of the methods 711 are listed in the activities for methods claimed below, and described above with respect to FIGS. 1-6 and 8-11. Thus, it should be noted that the methods described herein do not have to be executed in the order described, or in any particular order. Moreover, various activities described with respect to the methods identified herein can be executed in iterative, serial, or parallel fashion. Some activities may be added, and some of the included activities may be left out. Information, including parameters, commands, operands, and other data, can be sent and received in the form of one or more carrier waves.

Figure 8:
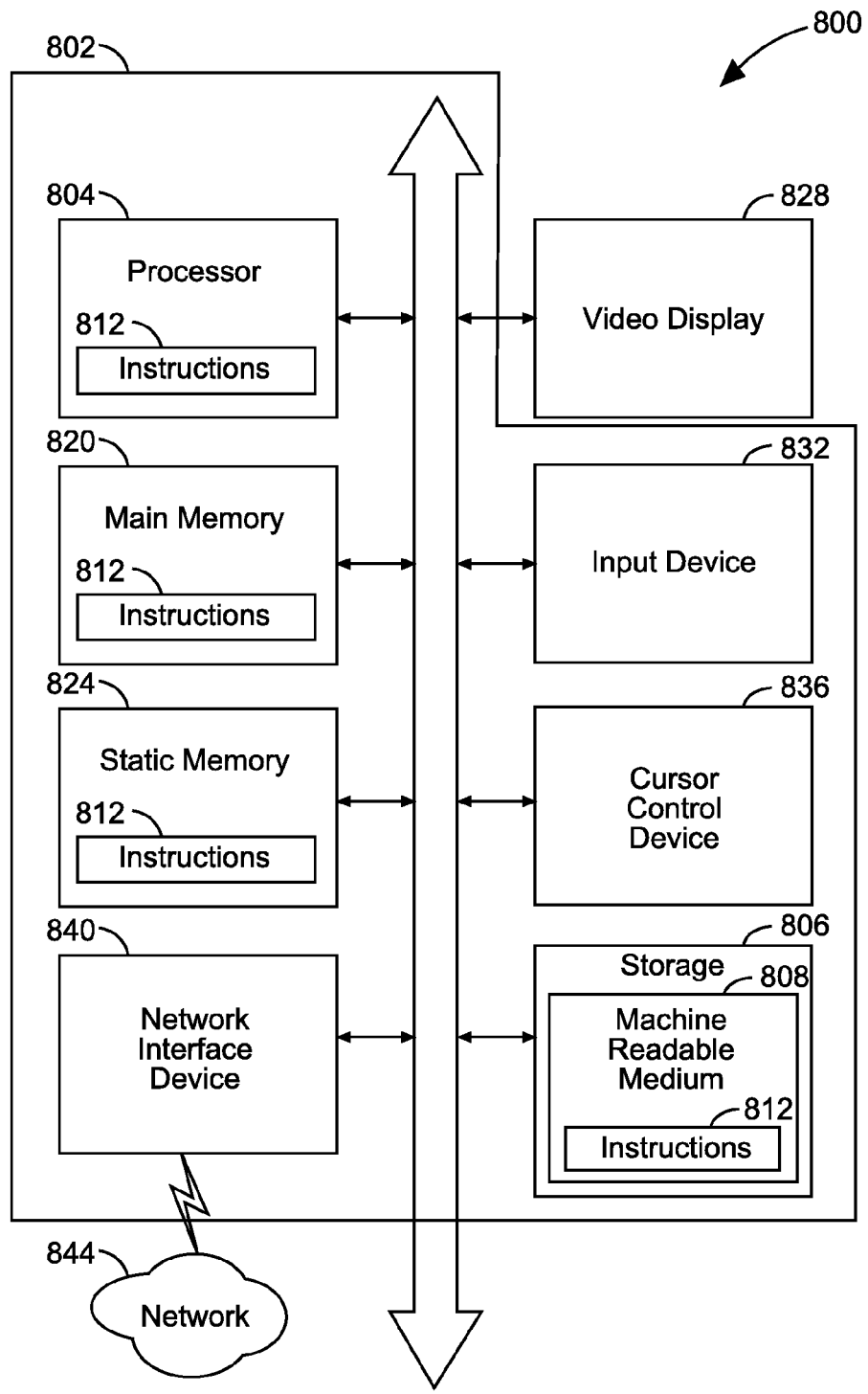
FIG. 8 is a block diagram of an article according to various embodiments of the invention.

FIG. 8 is a block diagram of an article 800 of manufacture, including a specific machine 802, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. In some embodiments, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 800 of manufacture, such as a computer, a memory system, a magnetic or optical disk, some other storage device, and/or any type of electronic device or system may include one or more processors 804 coupled to a machine-readable medium 808 such as a memory (e.g., removable storage media, as well as any memory including an electrical, optical, or electromagnetic conductor comprising non-transitory, tangible media) having instructions 812 stored thereon (e.g., computer program instructions), which when executed by the one or more processors 804 result in the machine 802 performing any of the actions described with respect to the methods above.

The machine 802 may take the form of a specific computer system having a processor 804 coupled to a number of components directly, and/or using a bus 816. Thus, the machine 802 may be similar to or identical to the workstation 454 shown in FIGS. 5 and 6, or the processor in the apparatus 1100 of FIG. 11.

Turning now to FIG. 8, it can be seen that the components of the machine 802 may include main memory 820, static or non-volatile memory 824, and mass storage 806. Other components coupled to the processor 804 may include an input device 832, such as a keyboard, or a cursor control device 836, such as a mouse. An output device 828, such as a video display, may be located apart from the machine 802 (as shown), or made as an integral part of the machine 802.

A network interface device 840 to couple the processor 804 and other components to a network 844 may also be coupled to the bus 816. The instructions 812 may be transmitted or received over the network 844 via the network interface device 840 utilizing any one of a number of well-known transfer protocols (e.g., HyperText Transfer Protocol). Any of these elements coupled to the bus 816 may be absent, present singly, or present in plural numbers, depending on the specific embodiment to be realized.

The processor 804, the memories 820, 824, and the storage device 806 may each include instructions 812 which, when executed, cause the machine 802 to perform any one or more of the methods described herein. In some embodiments, the machine 802 operates as a standalone device or may be connected (e.g., networked) to other machines. In a networked environment, the machine 802 may operate in the capacity of a server or a client machine in server-client network environment, or as a peer machine in a peer-to-peer (or distributed) network environment.

The machine 802 may comprise a personal computer (PC), a workstation, a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 802 is illustrated, the term "machine" shall also be taken to include any collection of machines that individually or jointly execute a set (or multiple sets) of instructions to perform any one or more of the methodologies discussed herein.

While the machine-readable medium 808 is shown as a single medium, the term "machine-readable medium" should be taken to include a single medium or multiple media (e.g., a centralized or distributed database, and/or associated caches and servers, and or a variety of storage media, such as the registers of the processor 804, memories 820, 824, and the storage device 806 that store the one or more sets of instructions 812. The term "machine-readable medium" shall also be taken to include any medium that is capable of storing, encoding or carrying a set of instructions for execution by the machine and that cause the machine 802 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Using the apparatus, systems, and methods disclosed herein, those in the petroleum recovery industry and other industries may now be able to more accurately and rapidly assess the properties of geologic formations. Increased operational efficiency and client satisfaction may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description and the figures, with each claim standing on its own as a separate embodiment.

What is claimed is:

1. An apparatus, comprising:
   azimuthally orthogonal dipole receiver arrays and azimuthally orthogonal transmitter arrays;
   logic to record a plurality of acoustic waveforms corresponding to acoustic waves received at the azimuthally orthogonal dipole receiver arrays, the waves being generated by the azimuthally orthogonal transmitter arrays; and
   a signal processor to estimate a global minimum of an objective function with respect to an azimuth angle and a set of auxiliary parameters associated with an auxiliary parameter space, said azimuth angle corresponding to an orientation of the transmitter arrays and the receiver arrays relative to fast and slow principal flexural wave axes, said signal processor to estimate said azimuth angle by minimizing the objective function analytically with respect to the azimuth angle at a point in the auxiliary parameter space, said signal processor to minimize the objective function at said analytically estimated azimuth angle with respect to the set of auxiliary parameters over a domain of the auxiliary parameter space, and to remove existing ambiguities associated with the fast and slow principal flexural wave axes.

2. The apparatus of claim 1, further comprising:
   a memory to receive and store values corresponding to the azimuth angle and the auxiliary parameters at the global minimum.

3. The apparatus of claim 1, further comprising:
   a telemetry transmitter to communicate values associated with the global minimum to a surface logging facility.

4. A system, comprising:
   a down hole tool;
   azimuthally orthogonal dipole receiver arrays and azimuthally orthogonal transmitter arrays, each of the arrays attached to the down hole tool;
   logic to record a plurality of acoustic waveforms corresponding to acoustic waves received at the azimuthally orthogonal dipole receiver arrays, the waves being generated by the azimuthally orthogonal transmitter arrays; and
   a signal processor to estimate a global minimum of an objective function with respect to an azimuth angle and a set of auxiliary parameters associated with an auxiliary parameter space, said azimuth angle corresponding to an orientation of the transmitter arrays and the receiver arrays relative to fast and slow principal flexural wave axes, said signal processor to estimate said azimuth angle by minimizing the objective function analytically with respect to the azimuth angle at a point in the auxiliary parameter space, said signal processor to minimize the objective function at said analytically estimated azimuth angle with respect to the set of auxiliary parameters over a domain of the auxiliary parameter space, and to remove existing ambiguities associated with the fast and slow principal flexural wave axes.

5. The system of claim 4, wherein the downhole tool comprises one of a wireline tool or a measurement while drilling tool.

6. The system of claim 4, further comprising:
   a surface computer comprising the signal processor.

7. A processor-implemented method to execute on one or more processors that perform the method, comprising:
   recording a plurality of acoustic waveforms corresponding to acoustic waves received at azimuthally orthogonal dipole receiver arrays surrounded by a geological formation, the waves being generated by azimuthally orthogonal transmitter arrays;
   defining an objective function dependent on the acoustic waveforms comprising cross-dipole waveforms, and an azimuth angle corresponding to an orientation of the transmitter arrays and the receiver arrays relative to fast and slow principal flexural wave axes and a set of auxiliary parameters;

analytically estimating a global minimum of the objective function with respect to the azimuth angle at a point in an auxiliary parameter space associated with the set of auxiliary parameters;

minimizing the objective function at the analytically estimated angle with respect to the auxiliary parameters;

removing existing ambiguities associated with the fast and slow principal flexural wave axes; and determining at least one property of the geological formation based on the global minimum.

8. The method of claim 7, wherein analytically estimating further comprises:

determining the global minimum by finding a minimum of the objective function with respect to the azimuth angle analytically at a point in the auxiliary parameter space.

9. The method of claim 8, wherein analytically estimating further comprises:

deriving an angular extrema equation to separate complementary trigonometric functions by differentiating the objective function with respect to the azimuth angle for the waveforms in the time or frequency domain, and the set of auxiliary parameters.

10. The method of claim 9, wherein the extrema equation is of the form $s_{2\theta}=F(c_{2\theta},X,s)$ or $c_{2\theta}=F(s_{2\theta},X,s)$, where the objective function is differentiated with respect to the angle $\theta$, in the time or frequency domain, and the set of auxiliary parameters s.

11. The method of claim 9, wherein analytically estimating further comprises:

determining locations in angle of extrema associated with the angular extrema equation, based on a form of the angular extrema equation.

12. The method of claim 11, wherein determining locations in angle of extrema comprises:

forming a polynomial equation by raising the angular extrema equation to a power and substituting a complimentary trigonometric identity.

13. The method of claim 12, further comprising:

solving for real roots of the polynomial equation, in a quadrant determined by the extrema equation.

14. The method of claim 13, wherein solving for real roots comprises using one of a numerical algorithm or an analytic solution.

15. The method of claim 8 wherein determining the global minimum by finding a minimum of the objective function comprises:

substituting candidate values comprising candidate angles or trigonometric equivalents of the candidate angles given by retained roots of the polynomial back into the objective function and selecting one of the candidate values that minimizes the objective function.

16. The method of claim 7 wherein minimizing the objective function at the analytically estimated angle with respect to the set of auxiliary parameters comprises:

conducting a numerical search or executing an analytical approach.

17. The method of claim 16, wherein the numerical search or the analytical approach operates to resolve the existing ambiguities.

18. An article including a non-transitory, machine-accessible medium having instructions stored therein, wherein the instructions, when accessed, result in a machine performing:

defining an objective function dependent on the acoustic waveforms comprising cross-dipole waveforms, and an azimuth angle corresponding to an orientation of the transmitter arrays and the receiver arrays relative to fast and slow principal flexural wave axes and a set of auxiliary parameters;

analytically estimating a global minimum of the objective function with respect to the azimuth angle at a point in an auxiliary parameter space associated with the set of auxiliary parameters;

minimizing the objective function at the analytically estimated angle with respect to the auxiliary parameters;

removing existing ambiguities associated with the fast and slow principal flexural wave axes; and determining at least one property of the geological formation based on the global minimum.

19. The article of claim 18, wherein the instructions, when accessed, result in a machine performing:

displaying the global minimum in conjunction with the at least one property of the geological formation.

20. The article of claim 18, wherein the instructions, when accessed, result in a machine performing:

characterizing fractures in the formation associated with an ambient stress field in the formation or identifying intrinsic anisotropy.

* * * * *